(12) United States Patent
Federspiel et al.

(10) Patent No.: US 7,639,125 B2
(45) Date of Patent: Dec. 29, 2009

(54) SEAT BELT WARNING SYSTEM

(75) Inventors: Laurent Federspiel, Munsbach (LU); Pierre Orlewski, Ettelbruck (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 245 days.

(21) Appl. No.: 11/578,982

(22) PCT Filed: Apr. 15, 2005

(86) PCT No.: PCT/EP2005/051667
§ 371 (c)(1),
(2), (4) Date: Oct. 18, 2006

(87) PCT Pub. No.: WO2005/102796
PCT Pub. Date: Nov. 3, 2005

(65) Prior Publication Data
US 2007/0205884 A1  Sep. 6, 2007

(30) Foreign Application Priority Data
Apr. 22, 2004  (EP) ................................. 04101684.1

(51) Int. Cl.
*B60Q 1/00* (2006.01)

(52) U.S. Cl. .................. 340/457.1; 340/457; 340/425.5; 340/438; 340/665; 701/45; 180/271; 180/273; 280/734; 73/290 V; 73/862.041; 73/862.046

(58) Field of Classification Search .............. 340/572.1, 340/441, 442, 443, 457.1, 446, 459, 457, 340/665, 500, 540, 436, 425.5, 552; 24/265 R, 24/572.1; 180/268, 271, 269, 273; 297/468; 342/42, 44, 50; 280/268; 73/290 V, 862.041, 73/862.046; 701/45; 324/207.1
See application file for complete search history.

(56) References Cited

U.S. PATENT DOCUMENTS

| 3,874,474 | A | | 4/1975 | Quantz |
| 4,553,099 | A | * | 11/1985 | Kasahara et al. ............ 324/458 |
| 4,885,566 | A | | 12/1989 | Aoki et al. |
| 5,871,063 | A | | 2/1999 | Young |
| 6,809,640 | B1 | * | 10/2004 | Sherman ................... 340/457.1 |
| 2004/0066287 | A1 | | 4/2004 | Breed et al. ................. 340/442 |
| 2004/0069075 | A1 | | 4/2004 | Jakoby et al. .......... 73/862.046 |

FOREIGN PATENT DOCUMENTS

DE           42 37 072          11/1992

OTHER PUBLICATIONS

International Search Report; PCT/EP2005/051667; Jul. 28, 2005 (all references in search report listed above).

* cited by examiner

*Primary Examiner*—Benjamin C Lee
*Assistant Examiner*—Sisay Yacob
(74) *Attorney, Agent, or Firm*—Cantor Colburn LLP

(57) ABSTRACT

A seat belt warning system comprises a sensing system associated to a vehicle seat for sensing a seat belt related status with respect to said vehicle seat and a control unit communicating with said sensing system for generating a warning signal depending on the seat belt related status determined by said sensing system. The sensing system comprises a seat occupancy detector (16) for determining a seat occupancy status of a vehicle seat and a seat belt fastening detector (18) for determining a seat belt usage condition. According to the invention said sensing system further comprises a first surface acoustic wave device (26) including at least one surface acoustic wave resonator (26') and an antenna (26") and in that said control unit (20) comprises an RF antenna (22) for remotely communicating with said surface acoustic wave device (26).

22 Claims, 2 Drawing Sheets

SEAT BELT WARNING SYSTEM

BACKGROUND OF THE INVENTION

The present invention relates generally to a seat belt warning system and more specifically to a seat belt reminder system comprising a seat occupancy sensor for detecting an occupancy of a vehicle seat and a seat belt sensor for detecting whether a seat belt is fastened or not.

Today's automotive safety standards require automotive vehicles to be equipped with seat belt reminder systems for reminding a vehicle passenger to fasten the seat belt associated to the occupied vehicle seat. While until now, those seat belt reminder systems where mainly associated with the front seats of the vehicle, future standards will require that also rear seat be equipped with such seat belt reminder systems.

Seat belt warning systems typically comprise a seat occupancy sensor associated with a vehicle seat for determining the presence of an occupant on the respective seat and for generating a signal indicative of such presence, and a seat belt fastening detector for determining a seat belt usage condition and for generating a signal indicative thereof. A control unit then uses the signals of the seat occupancy sensor and the seat belt fastening detector in order to deter-mine whether the actual seat occupancy would require a non-fastened seat belt to be fastened and, if this is the case, to issue a corresponding warning signal.

The seat occupancy sensors usually comprise pressure sensing devices integrated in the respective passenger seat for detecting a pressure induced by the presence of a passenger into the seat. The pressure sensing devices, as e.g. disclosed in DE-A-42 37 072, comprise a plurality of individual force sensors, which are connected in a suitable manner to a control unit designed for measuring a pressure depending electrical property of said individual pressure sensors. These occupancy sensors have proven to be very reliable and well adapted to the detection of seat occupancy.

The seat belt fastening detectors typically comprises mechanical or magnetic buckle switches for detecting, whether a latch of the seat belt is inserted into the seat belt buckle. One such buckle switch is e.g. disclosed in U.S. Pat. No. 5,871,063. As an alternative to the buckle switches, seat belt detectors have been proposed which generate a buckled/unbuckled signal based on the tension in the seat belt.

One drawback of the known seat belt warning systems lies in the fact, that the seat occupancy sensor and the seat belt fastening detector have to be physically connected to the control unit by means of connection wires in order to be functional. This need for physically connecting the sensing device to the control unit however causes problems especially in modern cars equipped with a flexible seating system with removable and/or displaceable back seats.

BRIEF SUMMARY OF THE INVENTION

In order to overcome the abovementioned problems, the present invention proposes a seat belt warning system comprising a sensing system associated to a vehicle seat for sensing a seat belt related status with respect to said vehicle seat and a control unit communicating with said sensing system for generating a warning signal depending on the seat belt related status determined by said sensing system. The sensing system comprises a seat occupancy detector for determining a seat occupancy status of a vehicle seat and a seat belt fastening detector for determining a seat belt usage condition. According to the invention said sensing system further comprises a first surface acoustic wave device including at least one surface acoustic wave resonator and an antenna and in that said control unit comprises an RF antenna for remotely communicating with said surface acoustic wave device.

In a preferred embodiment of the invention, the seat belt warning system comprises a plurality of individual sensing systems, each of said sensing systems being associated to at least one vehicle seat for sensing a seat belt related status with respect to said vehicle seat, and a single control unit communicating with each sensing system for generating a warning signal depending on the seat belt related status determined by said sensing system. In this embodiment at least one of said sensing systems comprises a seat occupancy detector, a seat belt fastening detector and a first surface acoustic wave device including at least one surface acoustic wave resonator and an antenna, while said single control unit comprises an RF antenna for remotely communicating with said surface acoustic wave device. It follows that in this embodiment, the different individual sensing systems are interfaced with one single control unit.

A surface acoustic wave resonator consists of a piezoelectric substrate with metallic structures (interdigital transducers) on its plain-polished surface. Due to piezoelectricity an electric signal at the interdigital transducers will stimulate a surface acoustic wave on the surface of the substrate. Vice versa a surface acoustic wave generates an electric charge distribution at the receiving interdigital transducers which is measurable as an electric signal. In case of a one port surface acoustic wave resonator only one interdigital transducer is connected electrically while the other interdigital transducers are reflective. If the interdigital transducer is connected to an antenna, the element is operable as a passive wirelessly interrogable system.

The surface acoustic wave resonator is connected to a miniaturized antenna so that the surface acoustic wave device acts as a resonator. If a radio frequency (RF) signal is sent to the surface acoustic wave device, the surface acoustic wave resonator oscillates at a given frequency and a response signal is wirelessly transmitted back to the control unit. The present invention uses this remote operability for remotely interrogating the sensing systems associated to the different vehicle seats. The surface acoustic wave device therefore is preferably connected to the seat occupancy sensor or the seat belt fastening detector in such a way, that the resonance frequency of the surface acoustic wave device is modulated depending on the output signals of these detectors.

The remote operability of the surface acoustic wave device enables the sensing system, which is integrated into the vehicle seat, to be remotely operated and interrogated without the need for cabling between the sensing system and the control unit. Thus a seat belt related status may be detected for all seats in a car without affecting the flexibility of a seating system with removable and/or displaceable back seats.

It will be noted that surface acoustic wave devices are totally passive sensor devices which do not require a dedicated power supply. Thus there is usually no need to provide a battery power for the surface acoustic wave device of the sensing system of the present invention to be operable. Furthermore, surface acoustic wave devices are characterized by their small size, low cost and rigged construction.

It will further be appreciated, that the seat belt fastening detector preferably comprises a seat belt buckle switch sensor. This seat belt buckle switch sensor is integrated into the seat belt buckle for detecting, whether the latch of the seat belt is inserted into the seat belt buckle. The seat belt buckle itself is typically mounted on the seat and not on the vehicle floor and accordingly the seat belt buckle is removable together with the seat (as is as the seat occupancy sensor). It follows that the seat belt fastening detector and the seat occupancy sensor are both permanently associated with the same seat which avoids conflicts of association between corresponding detectors of different seats.

The seat occupancy sensor preferably comprises a pressure sensitive switching device including a plurality of individual pressure sensors or switches arranged at different locations with respect to a seat surface. These pressure sensitive switching devices have proven to be very reliable and well adapted to the detection of seat occupancy.

Each of the occupancy sensor and the seat belt sensor could be equipped with an individual surface acoustic wave device and individually communicate with the central control unit. In a preferred embodiment however, the said seat occupancy sensor and said seat belt fastening detector remotely communicate so as to provide a combined occupancy and seat belt signal and wherein said combined occupancy and seat belt signal is transmitted to said control unit via said first surface acoustic wave device. This embodiment reduces the data volume to be transmitted between the sensing system and the control unit.

The remote communication between the two components of the sensing system may be achieved if said seat occupancy sensor comprises a second surface acoustic wave device including at least one surface acoustic wave resonator and an antenna and if that seat belt fastening detector comprises an electronic unit including an RF antenna for remotely communicating with said second surface acoustic wave device and for generating said combined occupancy and seat belt signal. It will be noted, that the electronic unit of the seat belt fastening detector should be powered in this embodiment in order to emit an interrogation frequency for the second surface acoustic wave device. The electronic unit may therefore be provided with a preferably rechargeable battery for providing the required electrical power. Alternatively the electronic unit may be connected to a piezo-powered generator associated with a seating surface of the vehicle seat. Such a piezo-powered generator comprises at least one piezoelectric element, which is e.g. integrated into the vehicle seat immediately below the upper seating surface. An occupant sitting in the vehicle seat exerts a varying pressure on the piezoelectric element due to vibrations caused by the vehicle movement, so that the piezo-powered generator generates the required power for the electronic unit.

It will be appreciated that such a piezo-powered generator may also be used if the seat belt buckle sensor needs powering in order to detect the latch inserted into the buckle.

In an advantageous embodiment of the invention said electronic unit is electrically connected to said first surface acoustic wave device so as to activate said first surface acoustic wave device when said combined occupancy and seat belt signal indicates a seat belt warning condition. This means that the surface acoustic wave device is not activated when no warning requiring seat belt status in present. It follows that the central control unit will receive no signal from the surface acoustic wave device and as a consequence, no warning will be issued.

The electronic unit may e.g. be connected in series between the surface acoustic wave resonator and the antenna of said first surface acoustic wave device so as to close a respective surface acoustic wave device circuit when a seat belt warning condition is present. It follows that the electronic unit acts as a switch for establishing an electrical connection between the surface acoustic wave resonator and the antenna. In the absence of a seat belt warning condition, the electronic unit will not close the circuit between the surface acoustic wave resonator and the antenna and the surface acoustic wave device is accordingly not active. Thus the control unit does not receive a signal from the surface acoustic wave device. If however a seat belt warning condition is present, the electronic unit will be triggered and the electrical contact between the surface acoustic wave resonator and the antenna is established. The control unit thus will receive a response signal from the surface acoustic wave device and may emit a corresponding warning signal.

In an alternative embodiment, the seat occupancy sensor and said seat belt fastening are interconnected in a combined logic circuit so as to provide a combined occupancy and seat belt signal and wherein said combined occupancy and seat belt signal is transmitted to said control unit via said surface acoustic wave device. The combined logic circuit may then be connected to the first surface acoustic wave device so as to activate said first surface acoustic wave device when said combined occupancy and seat belt signal indicates a seat belt warning condition. As in the previously described embodiment, the combined logic circuit is preferably connected in series between the surface acoustic wave resonator and the antenna of said first surface acoustic wave device.

It will be noted, that a single control unit may be used for operating and interrogating several sensing systems arranged in different seats of the car. In a possible embodiment, the RF antenna of the control unit may be arranged in a region of the car, where communication is possible with surface acoustic wave devices as well in the front seats as in the rear seats. It will be appreciated that in this case each of the surface acoustic wave devices associated to the different seats preferably operates in a different oscillating frequency range in order to be selectively addressable. Alternatively or additionally a radio frequency tag may be integrated in each of the surface acoustic wave devices in order to ensure the addressability of each device. In this embodiment, each sensing system accordingly comprises at least one identifier means to be detected by said single control unit, wherein the identifier means is preferably integrated into said first surface acoustic wave device.

BRIEF DESCRIPTION OF THE FIGURES

The present invention will be more apparent from the following description of several not limiting embodiments with reference to the attached drawings, wherein.

DETAILED DESCRIPTION OF THE INVENTION

Figure 1:
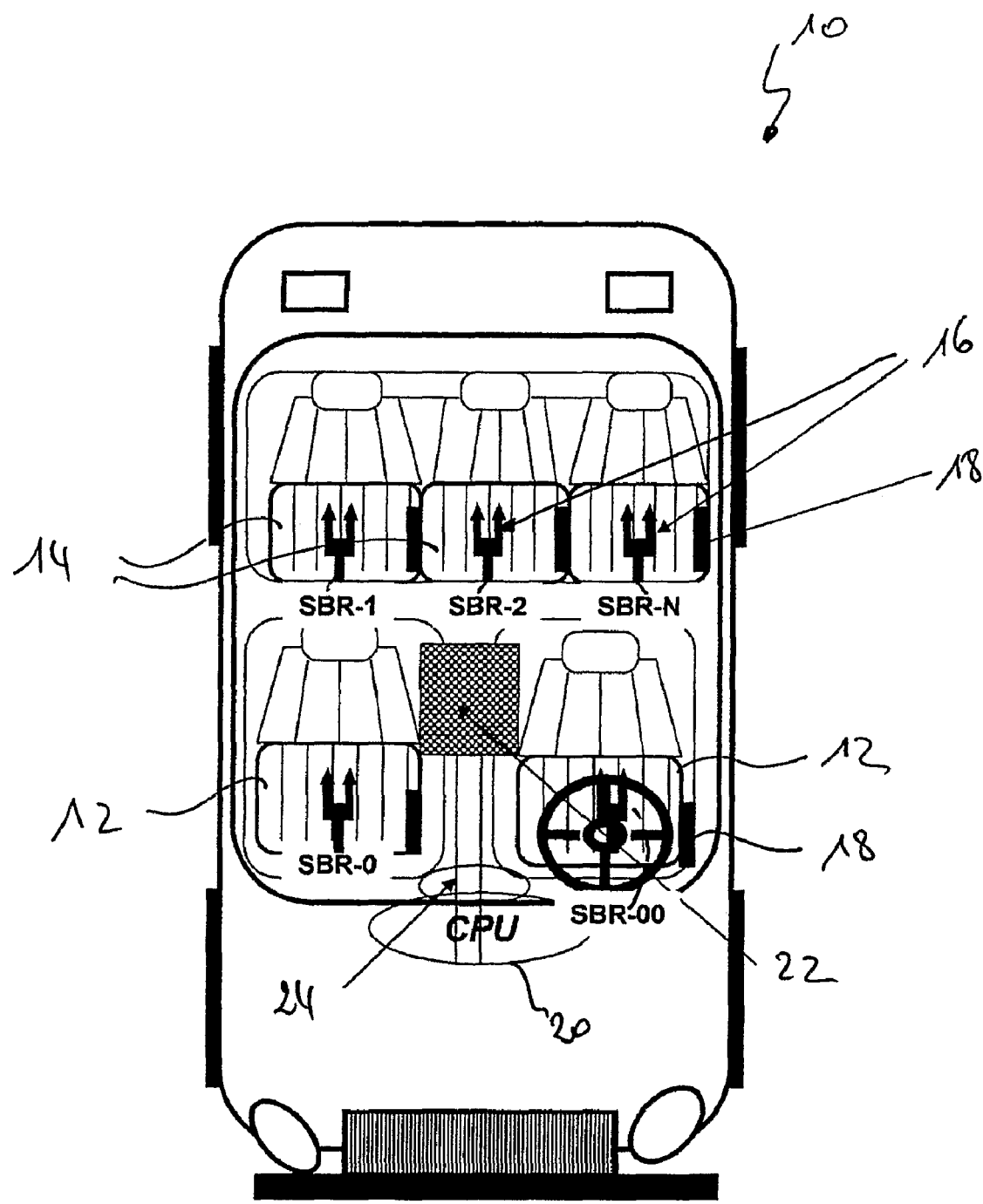
FIG. 1: schematically illustrates a vehicle interior compartment with several vehicle seats equipped with an embodiment of a seat belt warning system.

FIG. 1 schematically illustrates interior compartment of a vehicle 10 with two front seats 12 and three rear seats 14. The front seats 12 and the rear seats 14 are each equipped with a sensing system for sensing a seat belt related status associated to the respective seat. Each sensing system comprises a seat occupancy detector 16 which may consist of a pressure switching element integrated into a seating surface of the respective seat. Each sensing system further comprises a seat belt fastening detector 18, which may comprise a buckle switch sensor integrated into the seat belt buckle associated with the seat.

A central control unit 20 is mounted in a suitable location in the vehicle compartment. The central control unit is connected to a centrally located RF antenna 22 via interface 24. The central RF antenna is configured for remotely communicating with the sensing systems arranged in the different seats and for obtaining said seat belt related status from said sensing systems.

In order to achieve such remote communication, each sensing system is preferably equipped with a surface acoustic wave device 26 (see also FIG. 2) including at least one surface acoustic wave resonator 26' and an antenna 26'. The surface acoustic wave device 26 is e.g. integrated into the seat belt buckle for communication with the buckle switch sensor.

The seat occupancy sensor 16 and the seat belt fastening detector 18 may also communicate (via respective connection lines or via RF) so as to provide a combined occupancy and seat belt signal. The seat occupancy sensor 16 and the seat belt fastening detector 18 are associated to the surface acoustic wave device 26 so as to alter the resonance frequency of the surface acoustic wave device 26 depending on the combined occupancy and seat belt signal.

The central control unit 20 periodically or permanently emits an excitation frequency $RF_0$ via antenna 22 located e.g. in the vehicle roof. This excitation frequency $RF_0$ is received by the surface acoustic wave devices 26 and causes the surface acoustic wave resonator to oscillate with a frequency $RF_1$ or $RF_2$, which is depending on the combined occupancy and seat belt signal. This resonant frequency is subsequently received by antenna 22 and detected by central control unit 20. In this way, the combined occupancy and seat belt signal is accordingly transmitted to the control unit 20 by means of the surface acoustic wave device 26.

Figure 2:
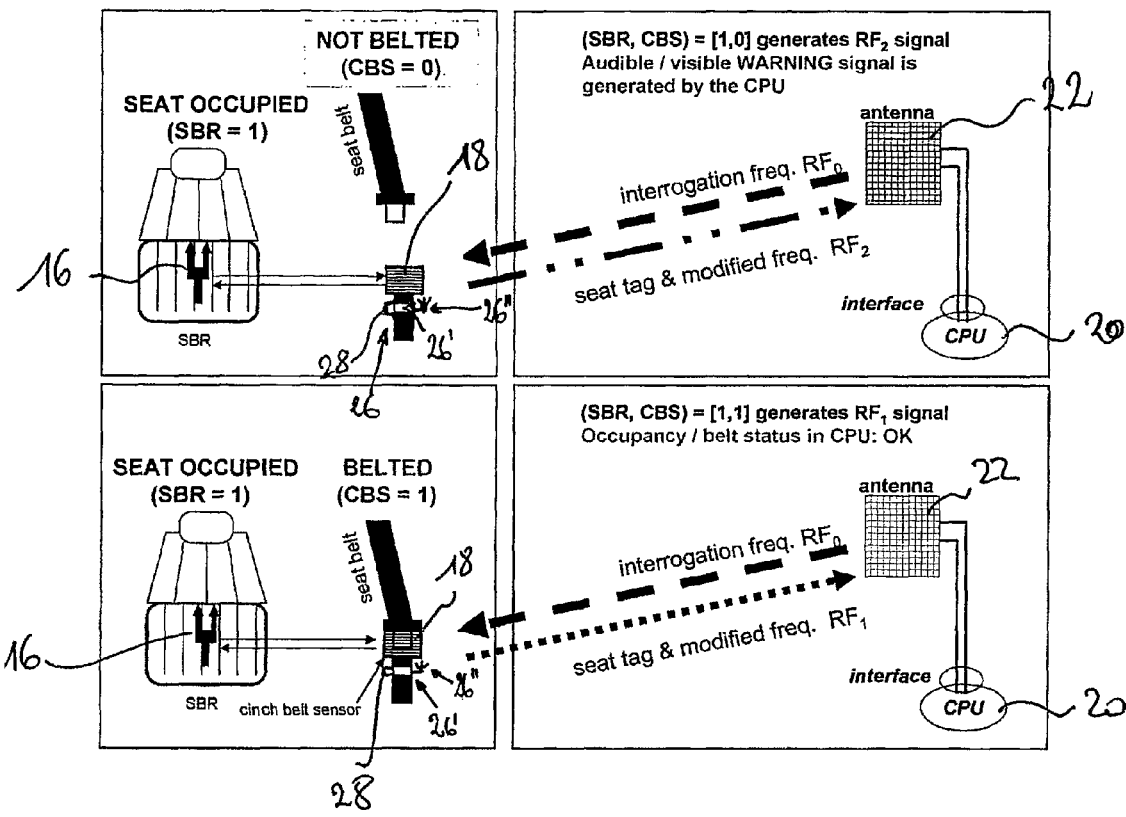
FIG. 2: illustrates the operation mode of one embodiment of the seat belt warning system.

If the received frequency $RF_2$ corresponds to a predetermined seat belt warning condition (e.g. seat occupied and seat belt unbuckled), the control unit 20 will subsequently issue a corresponding warning signal (audible, optical, tactile, etc.) 8 see upper part of FIG. 2). If however no predetermined seat belt warning condition is present (e.g. seat occupied and belt buckled or seat unoccupied) the control unit will receive a signal with a frequency $RF_1$ indicative of this condition and no alarm will be issued (lower part of FIG. 2).

It will be noted that each surface acoustic wave device 26 is preferably provided with an RF tag 28 enabling a safe identification of the respective surface acoustic wave device 26. As a result, the resonant frequency of each surface acoustic wave device will be safely identifiable and control unit 20 may correctly identify from which seat a specific signal emanates.

The invention claimed is:

1. Seat belt warning system comprising a sensing system associated to a vehicle seat for sensing a seat belt related status with respect to said vehicle seat and a control unit communicating with said sensing system for generating a warning signal depending on the seat belt related status determined by said sensing system, wherein said sensing system comprises a seat occupancy detector for determining a seat occupancy status of a vehicle seat, a seat belt fastening detector for determining a seat belt usage condition, a first surface acoustic wave device including at least one surface acoustic wave resonator and an antenna, said first surface acoustic wave device being connected to at least one of said seat occupancy sensor and said seat belt fastening device in such a way that a resonance frequency of the surface acoustic wave device is modulated depending on the output signals of the at least one of said seat occupancy sensor and said seat belt fastening device, whichever the surface acoustic wave device is connected to; and wherein said control unit comprises an RF antenna for remotely communicating with said surface acoustic wave device, and wherein said seat occupancy sensor and said seat belt fastening detector remotely communicate so as to provide a combined occupancy and seat belt signal and wherein said combined occupancy and seat belt signal is transmitted to said control unit via said first surface acoustic wave device.

2. Seat belt warning system comprising a plurality of individual sensing systems, each of said sensing systems being associated to at least one vehicle seat for sensing a seat belt related status with respect to said vehicle seat, and a single control unit communicating with each sensing system for generating a warning signal depending on the seat belt related status determined by said sensing system, wherein at least one of said sensing systems comprises a seat occupancy detector for determining a seat occupancy status of a vehicle seat, a seat belt fastening detector for determining a seat belt usage condition, and a first surface acoustic wave device including at least one surface acoustic wave resonator and an antenna, said first surface acoustic wave device being connected to at least one of said seat occupancy sensor and said seat belt fastening device in such a way that a resonance frequency of the surface acoustic wave device is modulated depending on the output signals of the at least one of said seat occupancy sensor and said seat belt fastening device, whichever the surface acoustic wave device is connected to; and wherein said single control unit comprises an RF antenna for remotely communicating with said surface acoustic wave device, and wherein said seat occupancy sensor and said seat belt fastening detector remotely communicate so as to provide a combined occupancy and seat belt signal and wherein said combined occupancy and seat belt signal is transmitted to said control unit via said first surface acoustic wave device.

3. Seat belt warning system according to claim 1, wherein said seat occupancy sensor comprises a second surface acoustic wave device including at least one surface acoustic wave resonator and an antenna and wherein said seat belt fastening detector comprises an electronic unit including an RF antenna for remotely communicating with said second surface acoustic wave device and for generating said combined occupancy and seat belt signal.

4. Seat belt warning system according to claim 3, wherein said electronic unit is electrically connected to said first surface acoustic wave device so as to activate said first surface acoustic wave device when said combined occupancy and seat belt signal indicates a seat belt warning condition.

5. Seat belt warning system according to claim 4, wherein said electronic unit is connected in series between the surface acoustic wave resonator and the antenna of said first surface acoustic wave device.

6. Seat belt warning system comprising a sensing system associated to a vehicle seat for sensing a seat belt related status with respect to said vehicle seat and a control unit communicating with said sensing system for generating a warning signal depending on the seat belt related status determined by said sensing system, wherein said sensing system comprises a seat occupancy detector for determining a seat occupancy status of a vehicle seat, a seat belt fastening detector for determining a seat belt usage condition, a first surface acoustic wave device including at least one surface acoustic wave resonator and an antenna, said first surface acoustic wave device being connected to at least one of said seat occupancy sensor and said seat belt fastening device in such a way that a resonance frequency of the surface acoustic wave device is modulated depending on the output signals of the at least one of said seat occupancy sensor and said seat belt fastening device, whichever the surface acoustic wave device is connected to; and wherein said control unit comprises an RF antenna for remotely communicating with said surface acoustic wave device, wherein said seat occupancy sensor and said seat belt fastening detector are interconnected in a combined logic circuit so as to provide a combined occupancy and seat belt signal and wherein said combined occupancy and seat belt signal is transmitted to said control unit via said surface acoustic wave device.

7. Seat belt warning system according to claim 6, wherein said combined logic circuit is electrically connected to said first surface acoustic wave device so as to activate said first surface acoustic wave device when said combined occupancy and seat belt signal indicates a seat belt warning condition.

8. Seat belt warning system according to claim 7, wherein said combined logic circuit is connected in series between the surface acoustic wave resonator and the antenna of said first surface acoustic wave device.

9. Seat belt warning system according to claim 1, wherein said sensing system comprises at least one identifier means to be detected by said single control unit.

10. Seat belt warning system according to claim 9, wherein said at least one identifier means is integrated into said first surface acoustic wave device.

11. Seat belt warning system according to claim 1, wherein said seat belt fastening detector comprises a seat belt buckle switch sensor.

12. Seat belt warning system according to claim 1, wherein said seat occupancy sensor comprises pressure sensitive switching device comprising a plurality of individual pressure sensors or switches arranged at different locations with respect to a seat surface.

13. Seat belt warning system according to claim 2, wherein said seat occupancy sensor comprises a second surface acoustic wave device including at least one surface acoustic wave resonator and an antenna and wherein said seat belt fastening detector comprises an electronic unit including an RF antenna for remotely communicating with said second surface acoustic wave device and for generating said combined occupancy and seat belt signal.

14. Seat belt warning system according to claim 13, wherein said electronic unit is electrically connected to said first surface acoustic wave device so as to activate said first surface acoustic wave device when said combined occupancy and seat belt signal indicates a seat belt warning condition.

15. Seat belt warning system according to claim 14, wherein said electronic unit is connected in series between the surface acoustic wave resonator and the antenna of said first surface acoustic wave device.

16. Seat belt warning system comprising a plurality of individual sensing systems, each of said sensing systems being associated to at least one vehicle seat for sensing a seat belt related status with respect to said vehicle seat, and a single control unit communicating with each sensing system for generating a warning signal depending on the seat belt related status determined by said sensing system, wherein at least one of said sensing systems comprises a seat occupancy detector for determining a seat occupancy status of a vehicle seat, a seat belt fastening detector for determining a seat belt usage condition, and a first surface acoustic wave device including at least one surface acoustic wave resonator and an antenna, said first surface acoustic wave device being connected to at least one of said seat occupancy sensor and said seat belt fastening device in such a way that a resonance frequency of the surface acoustic wave device is modulated depending on the output signals of the at least one of said seat occupancy sensor and said seat belt fastening device, whichever the surface acoustic wave device is connected to; and wherein said single control unit comprises an RF antenna for remotely communicating with said surface acoustic wave device, wherein said seat occupancy sensor and said seat belt fastening detector are interconnected in a combined logic circuit so as to provide a combined occupancy and seat belt signal and wherein said combined occupancy and seat belt signal is transmitted to said control unit via said surface acoustic wave device.

17. Seat belt warning system according to claim 16, wherein said combined logic circuit is electrically connected to said first surface acoustic wave device so as to activate said first surface acoustic wave device when said combined occupancy and seat belt signal indicates a seat belt warning condition.

18. Seat belt warning system according to claim 17, wherein said combined logic circuit is connected in series between the surface acoustic wave resonator and the antenna of said first surface acoustic wave device.

19. Seat belt warning system according to claim 2, wherein said sensing system comprises at least one identifier means to be detected by said single control unit.

20. Seat belt warning system according to claim 19, wherein said at least one identifier means is integrated into said first surface acoustic wave device.

21. Seat belt warning system according to claim 2, wherein said seat belt fastening detector comprises a seat belt buckle switch sensor.

22. Seat belt warning system according to claim 2, wherein said seat occupancy sensor comprises pressure sensitive switching device comprising a plurality of individual pressure sensors or switches arranged at different locations with respect to a seat surface.

* * * * *